(12) United States Patent
Beeram et al.

(10) Patent No.: US 12,375,398 B2
(45) Date of Patent: Jul. 29, 2025

(54) BANDWIDTH ADVERTISEMENT FOR FLOOR REFLECTOR (FR) TRAFFIC ENGINEERING (TE) LINKS

(71) Applicant: Juniper Networks, Inc., Sunnyvale, CA (US)

(72) Inventors: Vishnu Pavan Kumar Beeram, Hyderabad (IN); Chandrasekar Ramachandran, Bangalore (IN); Sudharsana Venkataraman, Brampton (CA)

(73) Assignee: Juniper Networks, Inc., Sunnyvale, CA (US)

( * ) Notice: Subject to any disclaimer, the term of this patent is extended or adjusted under 35 U.S.C. 154(b) by 29 days.

(21) Appl. No.: 18/401,463

(22) Filed: Dec. 30, 2023

(65) Prior Publication Data
US 2025/0219937 A1    Jul. 3, 2025

(51) Int. Cl.
*H04L 45/00* (2022.01)
*H04L 45/02* (2022.01)
*H04L 45/24* (2022.01)

(52) U.S. Cl.
CPC .............. *H04L 45/38* (2013.01); *H04L 45/04* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 9,286,473 B2 * | 3/2016 | Cruz Mota | H04W 12/122 |
| 2014/0204761 A1 * | 7/2014 | Durrani | H04L 47/125 370/236 |
| 2014/0222729 A1 * | 8/2014 | Dasgupta | H04L 63/1425 706/12 |
| 2015/0186642 A1 * | 7/2015 | Cruz Mota | G06F 21/554 726/23 |
| 2015/0195178 A1 * | 7/2015 | Bhattacharya | H04L 41/342 718/1 |
| 2016/0080195 A1 * | 3/2016 | Ramachandran | H04L 43/062 370/220 |
| 2016/0080251 A1 * | 3/2016 | Ramachandran | H04L 47/32 370/389 |
| 2016/0080268 A1 * | 3/2016 | Anand | H04L 12/4641 370/230.1 |
| 2016/0080280 A1 * | 3/2016 | Ramachandran | H04L 43/065 370/235 |
| 2016/0080502 A1 * | 3/2016 | Yadav | H04L 67/52 709/227 |

\* cited by examiner

*Primary Examiner* — Ranodhi Serrao
(74) *Attorney, Agent, or Firm* — John C. Pokotylo; Pokotylo Patent Services

(57) ABSTRACT

The problem of bandwidth insufficiency within an Intermediate System-to-Intermediate System (IS-IS) flood reflection (FR) cluster, and its associated problem(s) of increased signaling failures (and increased crank-bank signaling attempts, also referred to as "signaling churn") when traffic engineered (TE) paths are computed, is avoided by signaling a more realistic "available bandwidth" advertisement on the FR TE links.

20 Claims, 10 Drawing Sheets

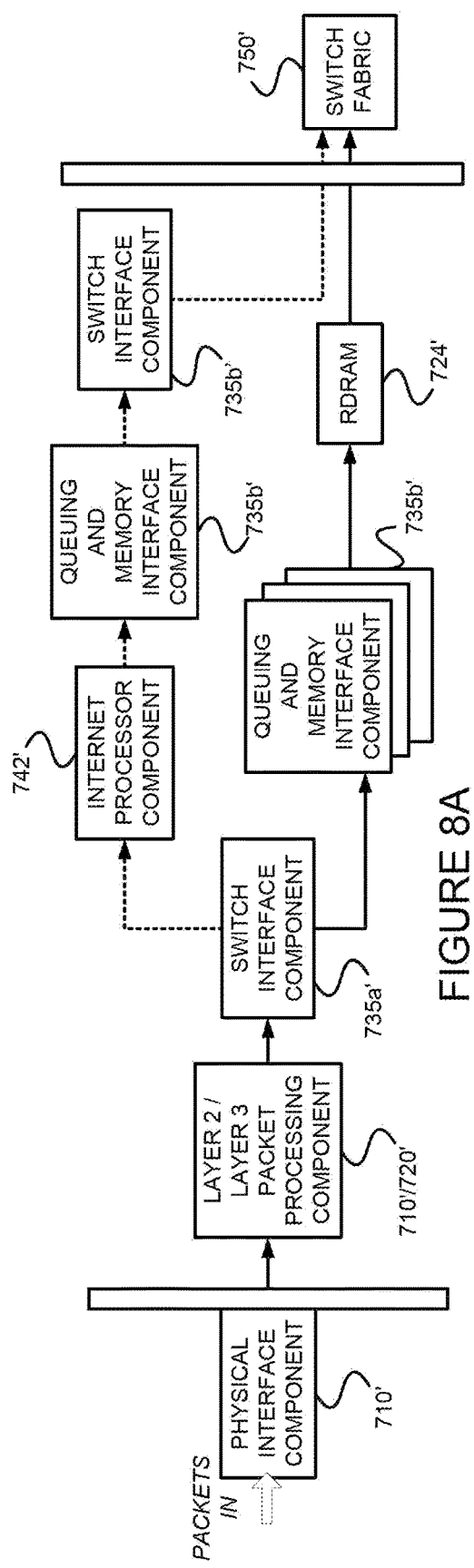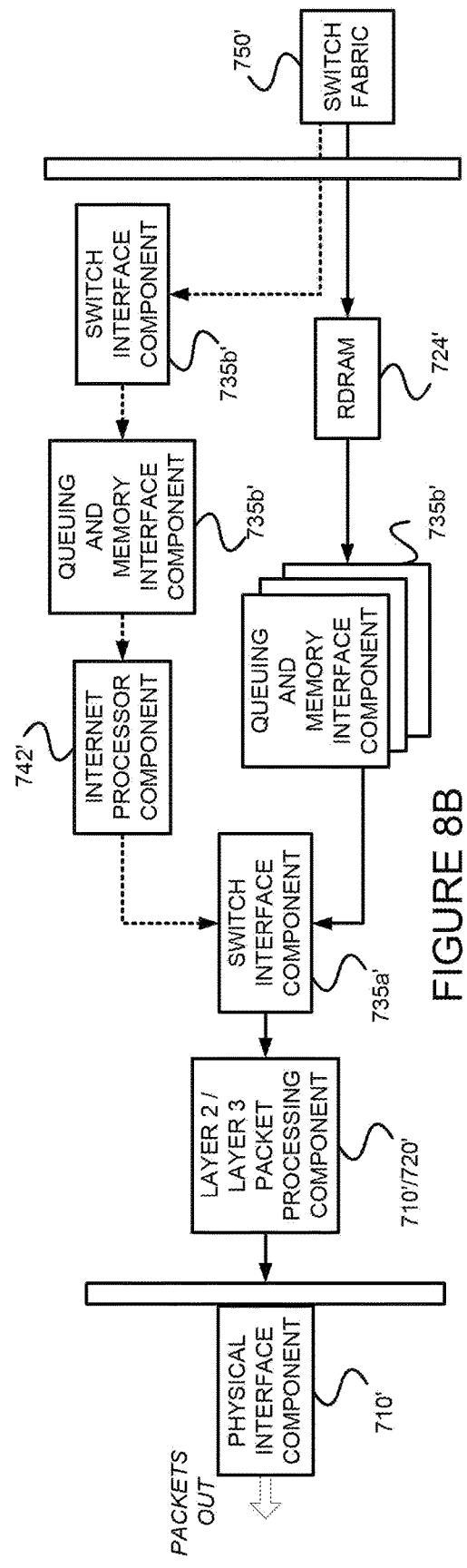

US 12,375,398 B2

BANDWIDTH ADVERTISEMENT FOR FLOOR REFLECTOR (FR) TRAFFIC ENGINEERING (TE) LINKS

§ 1. BACKGROUND OF THE INVENTION

§ 1.1 Field of the Invention

The present description concerns network communications. In particular, the present description concerns challenges associated with Intermediate System-to-Intermediate System (IS-IS) flood reflection (FR) clusters.

§ 1.2 Background Information

The document, T. Przygienda, Ed., "IS-IS Flood Reflection," *Request for Comments:* 9377 (Internet Engineering Task Force (IETF), April 2023) (referred to as "RFC 9377" and incorporated herein by reference) describes a backward-compatible, optional IS-IS extension that allows the creation of IS-IS flood reflection topologies. Flood reflection permits topologies in which IS-IS Level 1 (L1) areas provide transit-forwarding for IS-IS Level 2 (L2) areas using all available L1 nodes internally. It accomplishes this by creating L2 flood reflection adjacencies within each L1 area. Those adjacencies are used to flood L2 Link State Protocol Data Units (LSPDUs) and are used in the L2 Shortest Path First (SPF) computation. However, they are not ordinarily utilized for forwarding within the flood reflection cluster. This arrangement gives the L2 topology significantly better scaling properties than prevalently used flat designs. As an additional benefit, only those routers directly participating in flood reflection are required to support the feature. This allows for incremental deployment of scalable L1 transit areas in an existing, previously flat network design, without the necessity of upgrading all routers in the network.

FIG. 1 is a diagram of an example network topology 100 using flood reflector (FR) clusters (i.e., a flood reflection topology). More specifically, the example network topology 100 includes FR clusters 110a, 110b, 110c. The nodes within one of the FR clusters 110a,110b,110c may communicate with nodes in another of the FR clusters via a "backbone" of one or more L2 nodes 150.

In the example network topology 100, IS-IS level 1 (L1) nodes are depicted with dotted lines, L1L2 nodes are depicted with dot-dash lines, and L2 nodes are depicted with solid lines. FR cluster 400 110a includes at least one FR server 120a (Nodes 41 and 42) at the L1L2 IS-IS level, at least two IS-IS level 1 (L1) nodes 130a (Nodes 31, 32, 33, and 34) and at least two FR clients 140a (Nodes 21, 22, 23, and 24) at the L1L2 IS-IS leveL L1 links, depicted by dotted lines, are provided between at least some of the at least two L1 nodes 130a and the at least two FR clients 140a within the FR cluster 110a, and between at least some of the at least two L1 nodes 130a and at least one FR server 120a within the FR cluster 110a. Further, IS-IS level 2 (L2) FR links (also referred to as "FR TE links" if the L2 FR link is TE enabled (participating in a TE Database)), depicted as double lines, are provided between the each of the at least two FR clients 140a and the at least one FR server 120a within the FR cluster 110a. Similarly, FR cluster 100 110b includes at least one FR server 120b (Nodes 1 and 2) at the L1L2 IS-IS level, at least two IS-IS level 1 (L1) nodes 130b (Nodes 91, 92, 93, and 94) and at least two FR clients 140b (Nodes 81, 82, 83, and 84) at the L1L2 IS-IS level. L1 links, depicted by dotted lines, are provided between at least some of the at least two L1 nodes 130b and the at least two FR clients 140b within the FR cluster 110b, and between at least some of the at least two L1 nodes 130b and at least one FR server 120b within the FR cluster 110b. Further, IS-IS level 2 (L2) FR links (also referred to as "FR TE links"), depicted as double lines, are provided between the each of the at least two FR clients 140b and the at least one FR server 120b within the FR cluster 110b. Finally, FR cluster 700 110c includes at least one FR server 120c (Nodes 71 and 72) at the L1L2 IS-IS level, at least two IS-IS level 1 (L1) nodes 130b (Nodes 61, 62, 63, and 64) and at least two FR clients 140c (Nodes 51, 52, 53, and 54) at the L1L2 IS-IS level. L1 links, depicted by dotted lines, are provided between at least some of the at least two L1 nodes 130c and the at least two FR clients 140c within the FR cluster 110c, and between at least some of the at least two L1 nodes 130c and at least one FR server 120c within the FR cluster 110c. Further, IS-IS level 2 (L2) FR links (also referred to as "FR TE links"), depicted as double lines, are provided between the each of the at least two FR clients 140c and the at least one FR server 120c within the FR cluster 110c.

As noted above, a backbone, including at least two L2 nodes 150 (Nodes 11, 12, 13, 14, 15, 16, 17, and 18), is also provided. L2 links, depicted by solid lines, are provided between at least some of the at least two L2 nodes (150) and the at least two FR clients 140a, 140b, and 140c in each of the plurality of IS-IS FR clusters 110a, 110b, and 110c, respectively.

For purposes of this description, it is assumed that traffic engineered (TE) paths across the plurality of FR clusters 110a, 110b, and/or 110c are computed using abstract traffic engineering (TE) visibility. FIG. 2 illustrates the example network topology of FIG. 1 (without links shown to simplify the drawing) configured 100' to allow node 11 to communication with node 18 via nodes 21, 32, 42, 34, 24, 13, 51, 62, 72, 64, 54, 16, 81, 91, 1, 93, and 83.

As can be appreciated from RFC 9377, creating IS-IS FR clusters (Recall, e.g., 110a, 110b, and 110c.) provides significantly better scaling properties for the L2 than traditionally flat designs. L1 areas provide transit forwarding for L2 using all available L1 nodes (Recall, e.g., 130a, 130b, and 130c.) internally. L2 flood reflection adjacencies are created within each L1 area (each FR cluster corresponding to an L1 area that connects two FR clients on the L2 domain) to flood L2 link state protocol data units (LSPDUs), which are used in L2 shortest path first (SPF) computation(s). The presence of FR clusters in the network creates an Interdomain-TE scenario for purposes of TE path computation and/or placement. In such Interdomain-TE scenarios, deployment options for placing TE paths across FR Clusters (Recall, e.g., FIG. 2.) include either (A) Full TE Visibility, or (B) Abstract TE Visibility. Since "Full TE Visibility" provides complete topology visibility to the TE path computation nodes, it can provide more optimal paths, but at the expense of scalability. On the other hand, with "Abstract TE Visibility," only the L2 topology is visible to the TE path computation nodes. This option is more scalable, but may compute sub-optimal paths. The present description addresses a problem specific to the "Abstract TE Visibility" option.

§ 1.2.1 Challenges when Computing TE Paths in an Interdomain-TE Scenario (i.e., Across the Plurality of FR Clusters) when Using "Abstract TE Visibility"

When using the "Abstract TE Visibility" option in network topologies with multiple FR clusters (such as that 100 discussed above with respect to FIGS. 1 and 2), FR TE Links that are constructed without any underlying tunnels get advertised with "unlimited" bandwidth. Note that "unlimited", as used in this description, can be infinity, or any arbitrarily large number which, for purposes of TE path computation, might as well be infinity (e.g., 18.4467 Ebps in one example). That is, bandwidth within the FR cluster is assumed to be infinite. Unfortunately, however, deployment of FR clusters has shown that this is not a valid assumption or simplification. More specifically, bandwidth insufficiency within an FR cluster often increases signaling failures (and increases in crank-bank signaling attempts) when TE paths are computed using a network topology with "Abstract TE Visibility". Therefore, it would be useful to provide a solution that avoids this problem, while still remaining sufficiently scalable.

§ 2. SUMMARY OF THE INVENTION

Example embodiments consistent with the present description avoid the problem of bandwidth insufficiency within an FR cluster (and its associated problem(s) of increased signaling failures (and increased crank-bank signaling attempts, also referred to as "signaling churn") when TE paths are computed by signaling a more realistic "available bandwidth" advertisement on the FR TE links. Such example embodiments consistent with the present description may do so by providing a computer-implemented method, for use in a communications network including
  a plurality of IS-IS flood reflection (FR) clusters each including (1) at least one FR server, (2) at least two FR clients, (3) at least two IS-IS level 1 (L1) nodes, (4) L1 links between at least some of the at least two L1 nodes and the at least two FR clients within the FR cluster and between at least some of the at least two L1 nodes and at least one FR server within the FR cluster, and (5) IS-IS level 2 (L2) FR links between the each of the at least two FR clients and the at least one FR server within the FR cluster,
  a backbone including at least two L2 nodes, and
  L2 links between at least some of the at least two L2 nodes and the at least two FR clients in each of the plurality of IS-IS FR clusters,
in which traffic engineered (TE) paths across the plurality of FR clusters are computed using abstract traffic engineering (TE) visibility, the computer-implemented method being performed by a node serving as an endpoint terminating one of the L2 FR links and comprising: (a) receiving, for every local one of the L2 FR links terminated by the node, either (A) a max flow bandwidth to a remote end of the local one of the L2 FR links, or (B) information derived from a max flow bandwidth to a remote end of the local one of the L2 FR links; and (b) advertising, by an IS-IS protocol process, for receipt by any IS-IS L2 device, the (A) an available max flow bandwidth to a remote end of the local one of the L2 FR links terminated by the node, or (B) information derived from an available max flow bandwidth to a remote end of the local one of the L2 FR links terminated by the node received, in association with the local one of the L2 FR links, instead of advertising an unlimited bandwidth in association with the local one of the L2 FR links.

In at least some implementations, either (A) the max flow bandwidth to a remote end of the local one of the L2 FR links terminated by the node, or (B) the information derived from a max flow bandwidth to a remote end of the local one of the L2 FR links terminated by the node, is received from a path computation engine (PCE).

The node may be an FR client, and/or an FR servers.

In some implementations, the act of receiving, for every local one of the L2 FR links terminated by the node, either (A) a max flow bandwidth to a remote end of the local one of the L2 FR links, or (B) information derived from a max flow bandwidth to a remote end of the local one of the L2 FR links, is performed by a L2 FR link bandwidth management process, and the L2 FR link bandwidth management process and the IS-IS protocol process reside on the node. The PCE may reside on the node, or off of the node. If the PCE resides off of the node, a control message of a PCE protocol process includes a type-length-value (TLV) indicating (1) that there is no path being setup and (2) that the message is a request for a max-flow bandwidth computation.

In some implementations, the act of advertising, by an IS-IS protocol process, either (A) the available max flow bandwidth to a remote end of the local one of the L2 FR links terminated by the node, or (B) the information derived from the available max flow bandwidth to a remote end of the local one of the L2 FR links terminated by the node received, in association with the local one of the L2 FR links terminated by the node (instead of advertising an unlimited bandwidth in association with the local one of the L2 FR links terminated by the node) is performed periodically. In some implementations, the act of advertising, by an IS-IS protocol process, either (A) the available max flow bandwidth to a remote end of the local one of the L2 FR links terminated by the node, or (B) the information derived from the available max flow bandwidth to a remote end of the local one of the L2 FR links terminated by the node received, in association with the local one of the L2 FR links terminated by the node (instead of advertising an unlimited bandwidth in association with the local one of the L2 FR links terminated by the node) is performed responsive to a condition selected from a group of conditions consisting of: (A) an absolute bandwidth increase (on the local link) meeting an absolute increase threshold; (B) an absolute bandwidth decrease (on the local link) meeting an absolute decrease threshold; (C) a bandwidth increase percentage (on the local link) meeting a percentage increase threshold; and (D) a bandwidth decrease percentage (on the local link) meeting a percentage decrease threshold.

The node may include (a) at least one processor; and (b) a non-transitory storage system storing processor-executable instructions which, when executed by the at least one processor, cause the at least one processor to perform any of the foregoing methods.

A non-transitory computer-readable medium may be used to store processor-executable instructions which, when executed by at least one processor, cause the at least one processor to perform any of the foregoing methods.

§ 3. BRIEF DESCRIPTION OF THE DRAWINGS

FIGS. 8A and 8B is an example of operations of the example architecture of FIG. 7.

§ 4. DETAILED DESCRIPTION

Figure 1:
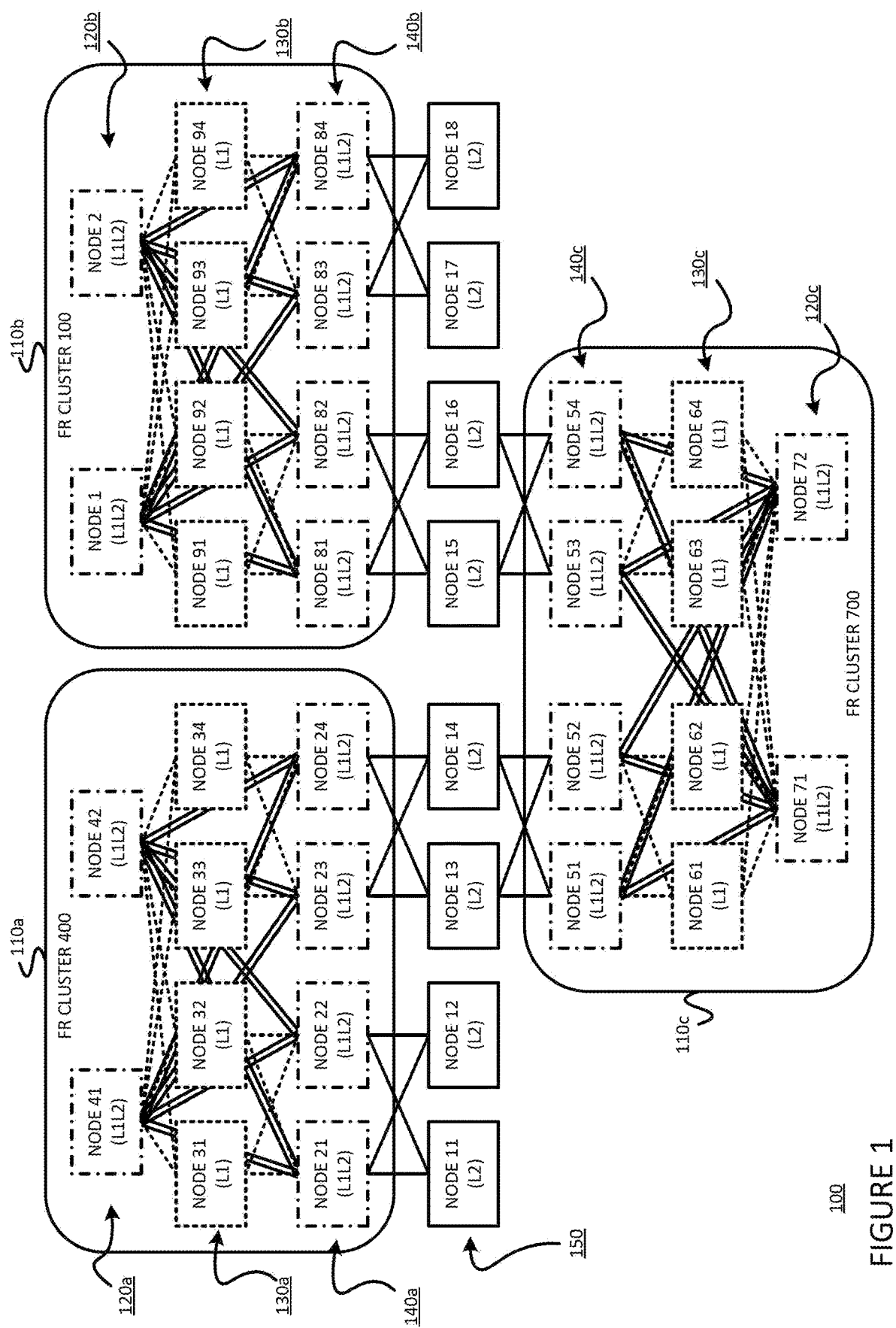
FIG. 1 is a diagram of an example network topology using FR clusters (i.e., a flood reflection topology).
Figure 2:
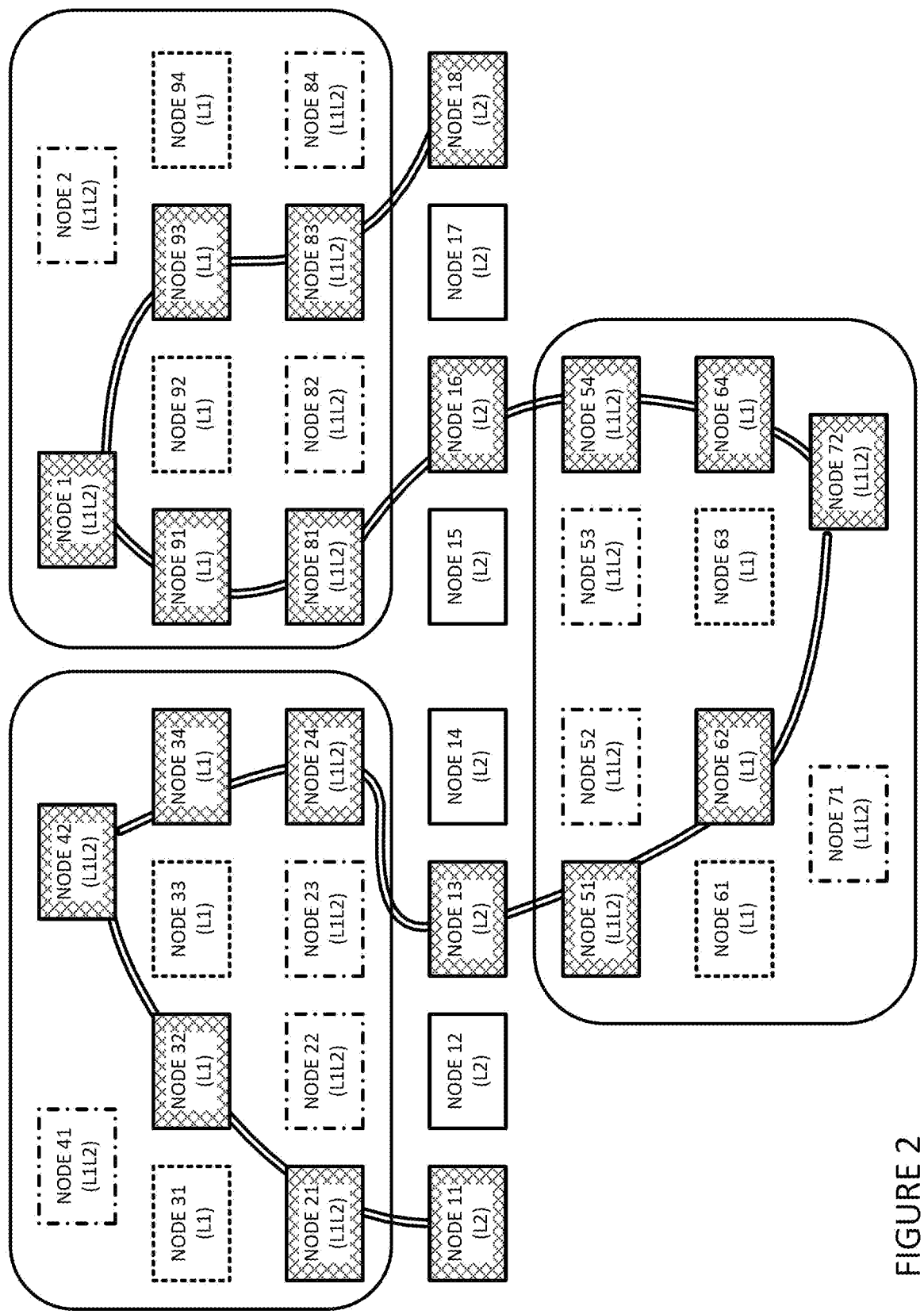
FIG. 2 is a diagram illustrating a path computed across FR clusters in the example network of FIG. 1.

The present disclosure may involve novel methods, apparatus, message formats, and/or data structures for avoiding the problem of bandwidth insufficiency within an FR cluster (and its associated problem(s) of increased signaling failures (and increased crank-bank signaling attempts, also referred to as "signaling churn")) when TE paths are computed. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Acronyms and Terminology

IS-IS Level 1 and Level 2 areas (mostly abbreviated as L1 and L2): IS-IS concepts where a routing domain has two "levels" with a single L2 area being the "backbone" that connects multiple L1 areas for scaling and reliability purposes. IS-IS architecture prescribes a routing domain with two "levels" where a single L2 area functions as the "backbone" that connects multiple L1 areas amongst themselves for scaling and reliability purposes. In such architecture, L2 can be used as transit for traffic carried from one L1 area to another, but L1 areas themselves cannot be used for that purpose because the L2 level must be a single "connected" entity, and all traffic exiting an L1 area flows along L2 routers until the traffic arrives at the destination L1 area itself.

FR: Flood Reflector.

FR TE Link: An L2 FR link that is TE enabled (participating in a TE Database).

Flood Reflector (or Flood Reflector Server): Node configured to connect in L2 only to flood reflector clients and to reflect (i.e., "re-flood") IS-IS L2 LSPs among them.

Flood Reflector Client: Node configured to build Flood Reflector Adjacencies to Flood Reflectors and to build normal adjacencies to other clients and L2 nodes not participating in flood reflection.

Flood Reflector Adjacency: IS-IS L2 adjacency where one end is a Flood Reflector Client, and the other, a Flood Reflector. Both have the same Flood Reflector Cluster ID.

Flood Reflector Cluster: Collection of clients and flood reflectors configured with the same cluster identifier.

Local (end of) FR TE Link: The end of an FR TE link terminated by a given node.

Remote end of FR TE Link: The end of an FR TE link terminated by a node adjacent to a given node.

Max-Flow Bandwidth: A bandwidth of a link calculated. It is the maximum bandwidth available across all available paths from a source node to a destination node.

Unlimited bandwidth: Any one of infinite bandwidth, and a high default value (e.g., 18.4467 Ebps) bandwidth. The high default value bandwidth will be selected such that, for practical path computation purposes, it might as well be infinite.

PCE: Path Computation Engine

Tunnel-Based Deployment: Deployment where Flood Reflector Clients build a partial or full mesh of tunnels in L1 to "shortcut" forwarding of L2 traffic through the cluster.

No-Tunnel Deployment: Deployment where Flood Reflector Clients redistribute L2 reachability into L1 to allow forwarding through the cluster without underlying tunnels.

Tunnel Endpoint: An endpoint that allows the establishment of a bidirectional tunnel carrying IS-IS control traffic or, alternately, serves as the origin of such a tunnel.

L1: Level 1 of an IGP (e.g., IS-IS).

L2: Level 2 of an IGP (e.g., IS-IS).

L1 shortcut: A tunnel established between two clients that is visible in L1 only and is used as a next hop, i.e., to carry data traffic in tunnel-based deployment mode.

§ 4.2 Overview

Example implementations consistent with the present description enhance BW advertisements for FR TE links. The following configuration "knob" may be used for enabling bandwidth tracking for FR TE links:

```
routing-options {
    flood-reflector-link-bandwidth-tracking {
        update-threshold {
            <threshold-percent>
            adaptive {
                limit <threshold-limit>
            }
            threshold-value <threshold-value>
        }
    }
}
```

For every "local" FR TE link (i.e., an FR TE link terminated by a node (e.g., a router)) configured in a manner consistent with the present description, an L2 FR Link Bandwidth Management process requests a path computation engine (PCE) (which may reside on the node, or which may be provided off the node) to compute the (available) max-flow bandwidth to the remote end of the FR TE link. In response, the PCE will notify the L2 FR Link Bandwidth Management process whenever there is a change to the max-flow bandwidth associated with the corresponding path computation request. The L2 FR Link Bandwidth Management process notifies the ISIS-TE protocol process whenever there is a "significant" change in the bandwidth (e.g., in terms of predetermined absolute and/or relative bandwidth changes). In response, the IS-IS TE protocol advertises the available max bandwidth as "Unreserved Bandwidth". That is, the available max bandwidth is used instead of assuming an infinite (or arbitrarily high) available bandwidth. Further, advertisements may be triggered responsive to "significant" available max bandwidth changes.

§ 4.3 Example Method(s)

Figure 3:
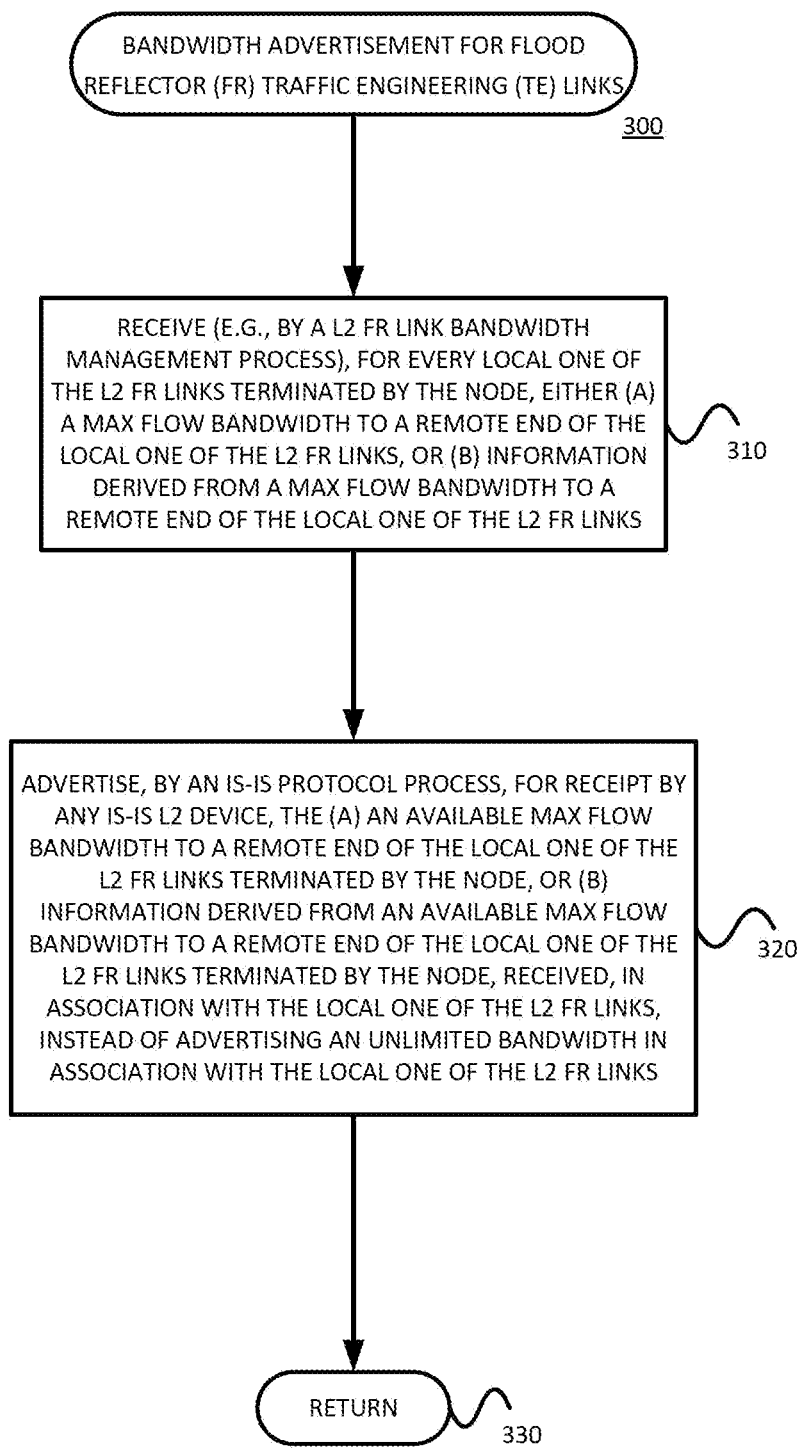
FIG. 3 is a flow diagram of an example method for advertising the bandwidth for flood reflector (FR) traffic engineering (TE) links.

FIG. 3 is a flow diagram of an example method 300, for use in a communications network including

- a plurality of IS-IS flood reflection (FR) clusters (Recall, e.g., 110*a*, 110*b*, 110*c* of FIG. 1.) each including (1) at least one FR server (Recall, e.g., 120*a*, 120*b*, 120*c* of FIG. 1.), (2) at least two FR clients (Recall, e.g., 140*a*, 140*b* 140*c* of FIG. 1.), (3) at least two IS-IS level 1 (L1) nodes (Recall, e.g., 130*a*, 130*b*, 130*c* of FIG. 1.), (4) L1 links between at least some of the at least two L1 nodes and the at least two FR clients within the FR cluster and between at least some of the at least two L1 nodes and at least one FR server within the FR cluster (Recall, e.g., the dotted lines in FIG. 1.), and (5) IS-IS level 2 (L2) FR links between the each of the at least two FR clients and the at least one FR server within the FR cluster (Recall, e.g., the double solid lines of FIG. 1.),
- a backbone including at least two L2 nodes (Recall, e.g., 150 of FIG. 1.), and
- L2 links between at least some of the at least two L2 nodes and the at least two FR clients in each of the plurality of IS-IS FR clusters (Recall, e.g., the single solid lines of FIG. 1.), in which traffic engineered (TE) paths across the plurality of FR clusters are computed using abstract traffic engineering (TE) visibility. The example method 300 may be performed by a node serving as an endpoint terminating one of the L2 FR links. For example, the node may be an FR client, or an FR server.

Referring to FIG. 3, the example method 300 for advertising bandwidth for FR TE links may include receiving (e.g., by a L2 FR link bandwidth management process), for every local one of the L2 FR links terminated by the node, either (A) a max flow bandwidth to a remote end of the local one of the L2 FR links, or (B) information derived from a max flow bandwidth to a remote end of the local one of the L2 FR links. (Block 310) The example method 300 may then advertise, by an IS-IS protocol process, for receipt by any IS-IS L2 device, the (A) available max flow bandwidth to a remote end of the local one of the L2 FR links terminated by the node, or (B) information derived from an available max flow bandwidth to a remote end of the local one of the L2 FR links terminated by the node received, in association with the local one of the L2 FR links, instead of advertising an unlimited bandwidth in association with the local one of the L2 FR links. (Block 320) The example method 300 may then be left. (Return node 330)

§ 4.3.1 Refinements, Alternative, and Extensions of the Example Method(s)

In some example embodiments, the act of receiving, for every local one of the L2 FR links terminated by the node, either (A) a max flow bandwidth to a remote end of the local one of the L2 FR links, or (B) information derived from a max flow bandwidth to a remote end of the local one of the L2 FR links, is performed by an L2 FR link bandwidth management process. The L2 FR link bandwidth management process may reside on the node.

In some example embodiments, either (A) the max flow bandwidth to a remote end of the local one of the L2 FR links terminated by the node, or (B) the information derived from a max flow bandwidth to a remote end of the local one of the L2 FR links terminated by the node, is received from a path computation engine (PCE). The PCE may reside on the node, or off of the node. If the PCE resides off of the node, a control message of a PCE protocol process includes a type-length-value (TLV) indicating (1) that there is no path being setup and (2) that the message is a request for a max-flow bandwidth computation.

In some example embodiments, either (A) the max flow bandwidth to a remote end of the local one of the L2 FR links terminated by the node, or (B) the information derived from a max flow bandwidth to a remote end of the local one of the L2 FR links terminated by the node, received by the L2 FR link bandwidth management process is received from a path computation engine (PCE) in response to a request from the L2 FR link bandwidth management process to the PCE.

Referring back to block 320 of FIG. 3, in some example embodiments, the act of advertising, by an IS-IS protocol process, either (A) the available max flow bandwidth to a remote end of the local one of the L2 FR links terminated by the node, or (B) the information derived from the available max flow bandwidth to a remote end of the local one of the L2 FR links terminated by the node received, in association with the local one of the L2 FR links terminated by the node (instead of advertising an unlimited bandwidth in association with the local one of the L2 FR links terminated by the node) is performed periodically. In other example embodiments, the act of advertising, by an IS-IS protocol process, either (A) the available max flow bandwidth to a remote end of the local one of the L2 FR links terminated by the node, or (B) the information derived from the available max flow bandwidth to a remote end of the local one of the L2 FR links terminated by the node received, in association with the local one of the L2 FR links terminated by the node (instead of advertising an unlimited bandwidth in association with the local one of the L2 FR links terminated by the node) is performed responsive to a condition selected from a group of conditions consisting of: (A) an absolute bandwidth increase meeting an absolute increase threshold; (B) an absolute bandwidth decrease meeting an absolute decrease threshold; (C) a bandwidth increase percentage meeting a percentage increase threshold; and (D) a bandwidth decrease percentage meeting a percentage decrease threshold.

§ 4.4 Example Illustrating Operation of Example Method

Figure 4:
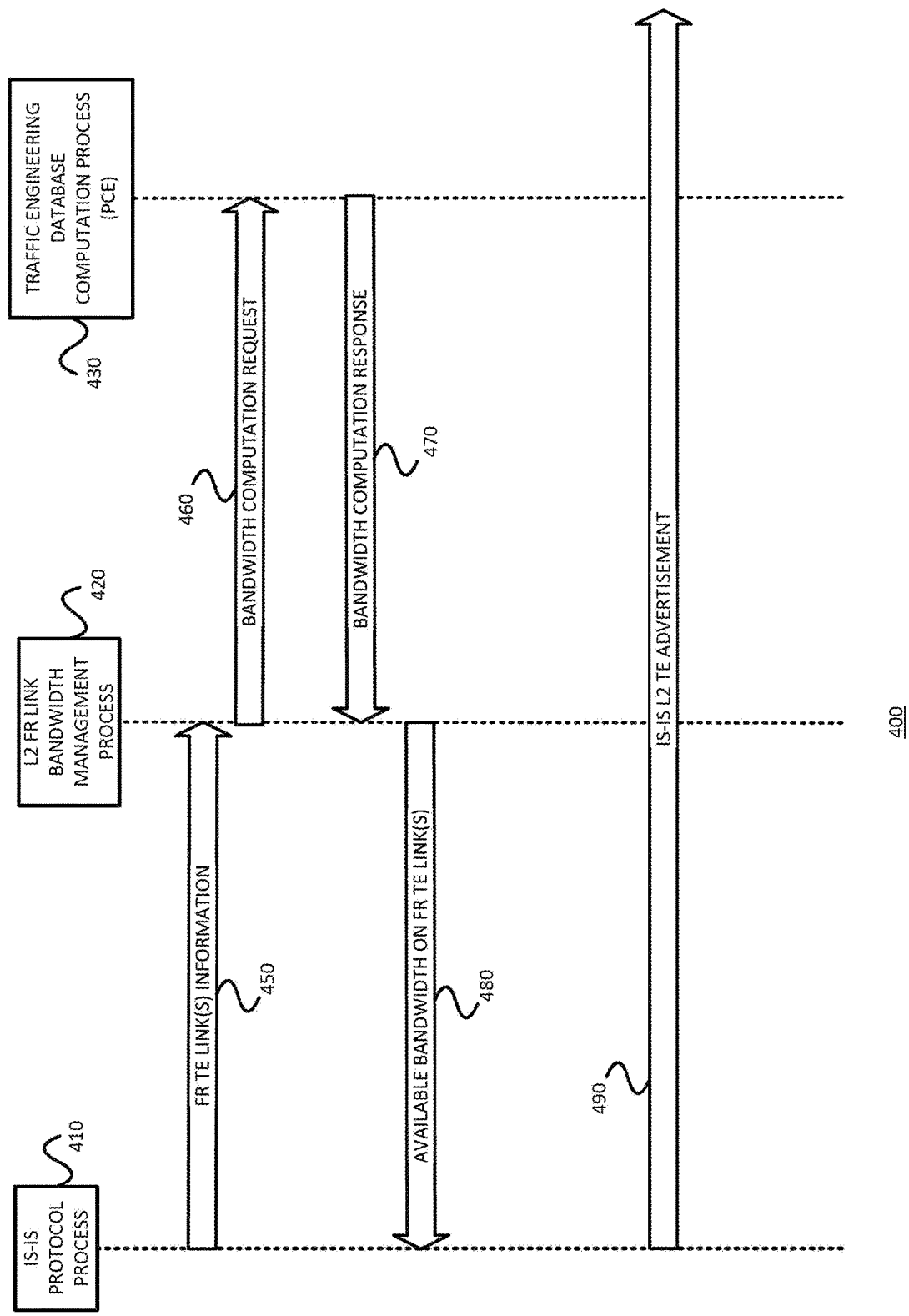
FIG. 4 is a timing diagram showing communications between components or modules that may be used to implement the example method illustrated in FIG. 3.

FIG. 4 is a timing diagram showing communications between components or modules that may be used to implement the example method illustrated in FIG. 3. The node serving as an endpoint terminating one of the L2 FR links (e.g., an FR client, or an FR server) may include hardware and/or software for performing an IS-IS protocol process 410, an L2 FR link bandwidth management process 420, and a traffic engineering (TE) database computation process (e.g., a path computation engine or PCE) 430. The sequence of the various communications between the processes progresses downward in FIG. 4. More specifically, the IS-IS Protocol process 410 sends information about FR TE link(s) 450 to the LS FR link bandwidth management process 420.

For every "local" FR TE link (i.e., an FR TE link terminated by a node (e.g., a router)) configured in a manner consistent with the present description, the L2 FR Link Bandwidth Management process 420 sends a bandwidth (of the FR TE link(s) computation request 460 to the TE database computation process (e.g., path computation engine (PCE) (which may reside on the node, or which may be provided off the node) 430 to compute the (available) max-flow bandwidth to the remote end of the FR TE link. In response, the TE database computation process 430 will notify the L2 FR Link Bandwidth Management process 420 whenever there is a "significant" change (per configuration) to the max-flow bandwidth associated with the corresponding path computation request, as indicated by communication 470. The L2 FR Link Bandwidth Management process 420 then notifies the ISIS-TE protocol process 410 whenever there is a "significant" change in the bandwidth (e.g., in terms of predetermined absolute and/or relative BW changes). In response, the IS-IS TE protocol process 410 advertises, to the other nodes in the L2 IS-IS domain, the available max bandwidth as "Unreserved Bandwidth". That is, the available max bandwidth is used instead of assuming an infinite (or arbitrarily high) available bandwidth. Further, advertisements may be triggered responsive to "significant" available max bandwidth changes.

§ 4.5 Example Apparatus

Figure 5:
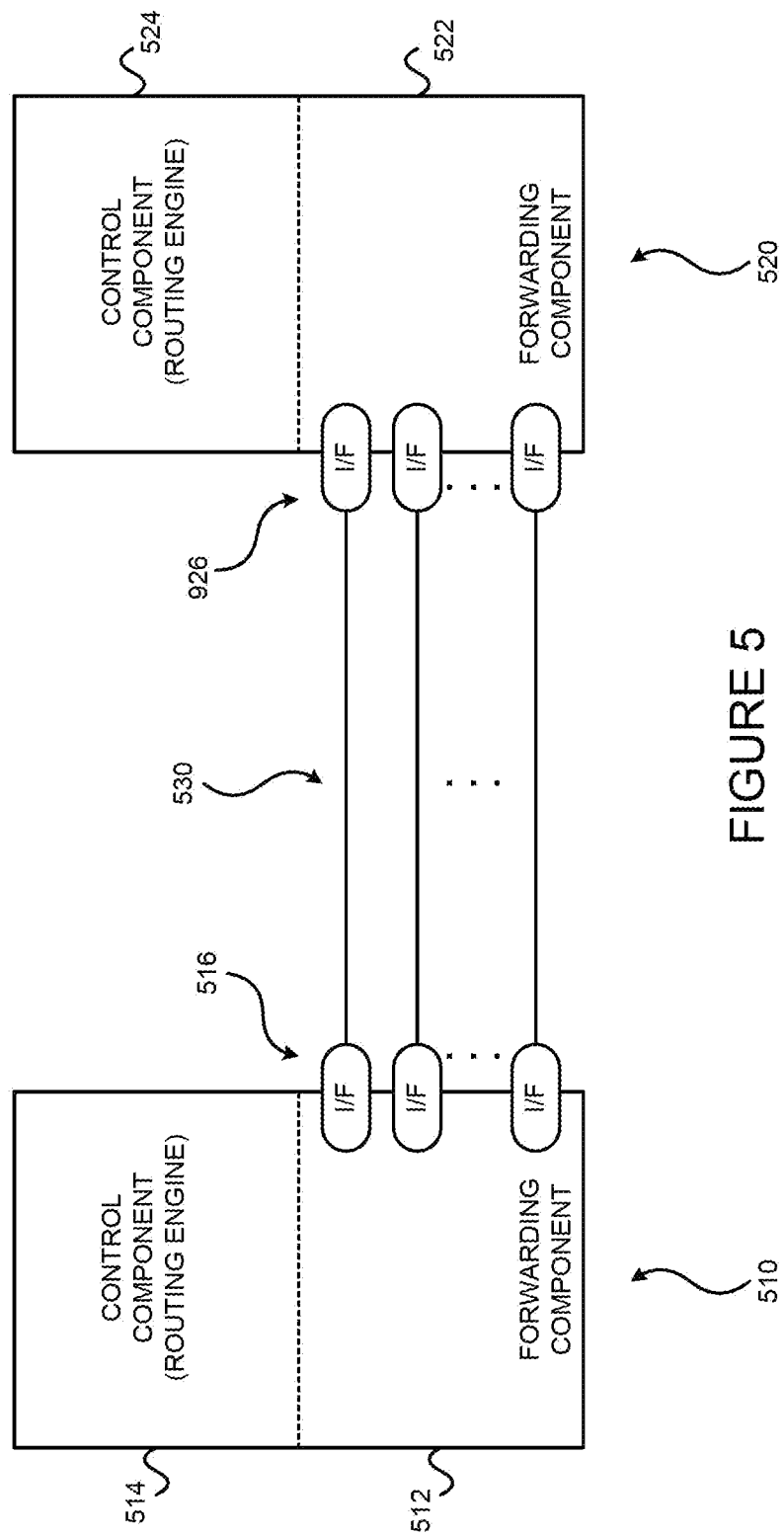
FIG. 5 illustrates two data forwarding systems, which may be used as nodes, coupled via communications links, in a communications network, such as a communications network including FR clusters.

The data communications network nodes may be forwarding devices, such as routers for example. FIG. 5 illustrates two data forwarding systems 510 and 520 coupled via communications links 530. The links may be physical links or "wireless" links. The data forwarding systems 510,520 may be routers for example. If the data forwarding systems 510,520 are example routers, each may include a control component (e.g., a routing engine) 514,524 and a forwarding component 512,522. Each data forwarding system 510,520 includes one or more interfaces 516,526 that terminate one or more communications links 530.

As just discussed above, and referring to FIG. 6, some example routers 600 include a control component (e.g., routing engine) 610 and a packet forwarding component (e.g., a packet forwarding engine) 690.

The control component 610 may include an operating system (OS) kernel 620, routing protocol process(es) 630, label-based forwarding protocol process(es) 640, interface process(es) 650, user interface (e.g., command line interface) process(es) 660, and chassis process(es) 670, and may store routing table(s) 639, label forwarding information 645, and forwarding (e.g., route-based and/or label-based) table (s) 680. As shown, the routing protocol process(es) 630 may support routing protocols such as the routing information protocol ("RIP") 631, the intermediate system-to-intermediate system protocol ("IS-IS") 632, the open shortest path first protocol ("OSPF") 633, the enhanced interior gateway routing protocol ("EIGRP") 634 and the border gateway protocol ("BGP") 635, and the label-based forwarding protocol process(es) 640 may support protocols such as BGP 635, the label distribution protocol ("LDP") 636, the resource reservation protocol ("RSVP") 637, EVPN 638 and L2VPN 639. One or more components (not shown) may permit a user 665 to interact with the user interface process (es) 660. Similarly, one or more components (not shown) may permit an outside device to interact with one or more of the router protocol process(es) 630, the label-based forwarding protocol process(es) 640, the interface process(es) 650, and the chassis process(es) 670, via SNMP 685, and such processes may send information to an outside device via SNMP 685.

The packet forwarding component 690 may include a microkernel 692 over hardware components (e.g., ASICs, switch fabric, optics, etc.) 691, interface process(es) 693, ASIC drivers 694, chassis process(es) 695 and forwarding (e.g., route-based and/or label-based) table(s) 696.

Figure 6:
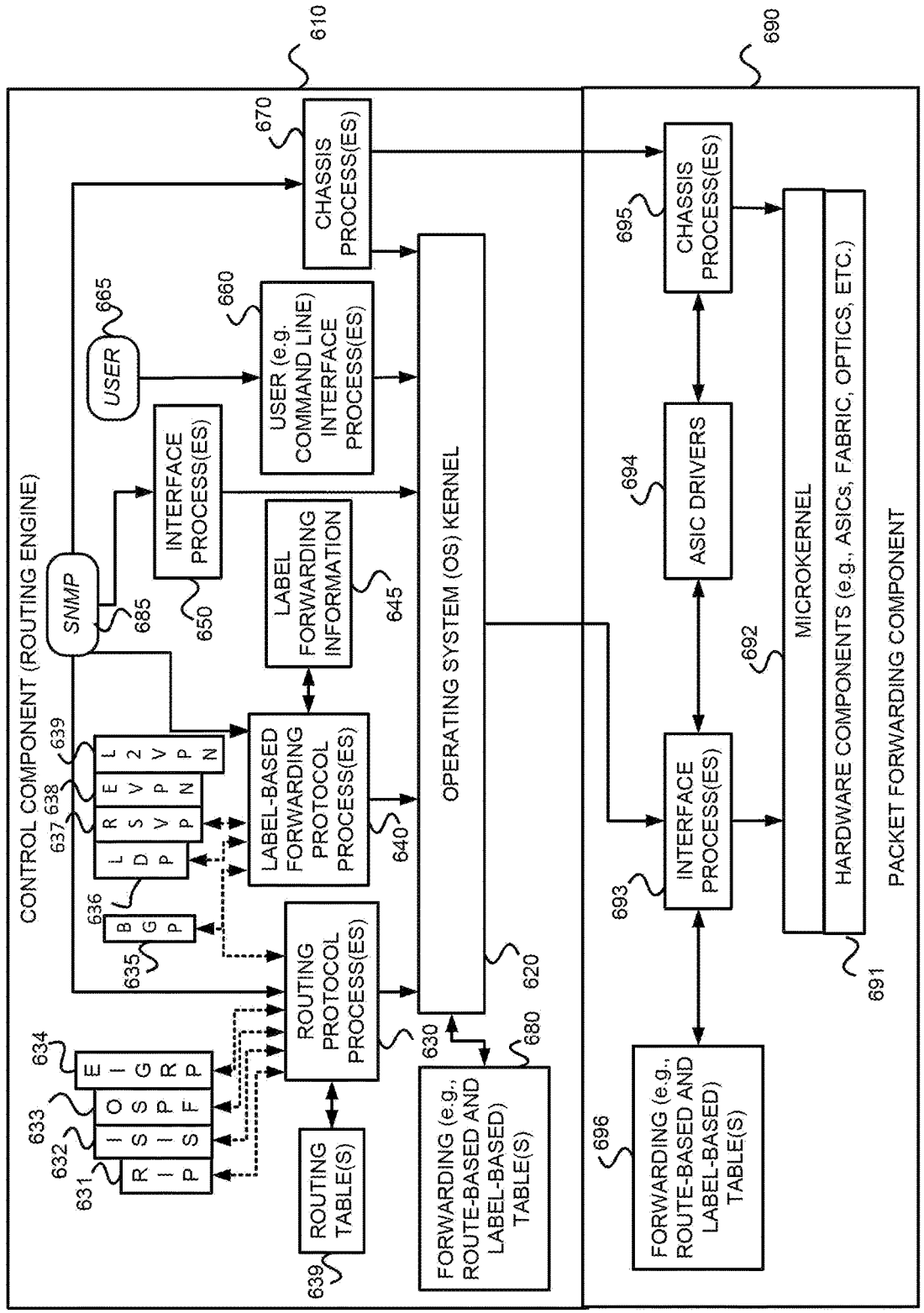
FIG. 6 is a block diagram of a router which may be used a communications network, such as a communications network including FR clusters.

In the example router 600 of FIG. 6, the control component 610 handles tasks such as performing routing protocols, performing label-based forwarding protocols, control packet processing, etc., which frees the packet forwarding component 690 to forward received packets quickly. That is, received control packets (e.g., routing protocol packets and/or label-based forwarding protocol packets) are not fully processed on the packet forwarding component 690 itself, but are passed to the control component 610, thereby reducing the amount of work that the packet forwarding component 690 has to do and freeing it to process packets to be forwarded efficiently. Thus, the control component 610 is primarily responsible for running routing protocols and/or label-based forwarding protocols, maintaining the routing tables and/or label forwarding information, sending forwarding table updates to the packet forwarding component 690, and performing system management. The example control component 610 may handle routing protocol packets, provide a management interface, provide configuration management, perform accounting, and provide alarms. The processes 630, 640, 650, 660 and 670 may be modular, and may interact with the OS kernel 620. That is, nearly all of the processes communicate directly with the OS kernel 620. Using modular software that cleanly separates processes from each other isolates problems of a given process so that such problems do not impact other processes that may be running. Additionally, using modular software facilitates easier scaling.

Still referring to FIG. 6, the example OS kernel 620 may incorporate an application programming interface ("API") system for external program calls and scripting capabilities. The control component 610 may be based on an Intel PCI platform running the OS from flash memory, with an alternate copy stored on the router's hard disk. The OS kernel 620 is layered on the Intel PCI platform and establishes communication between the Intel PCI platform and processes of the control component 610. The OS kernel 620 also ensures that the forwarding tables 696 in use by the packet forwarding component 690 are in sync with those 680 in the control component 610. Thus, in addition to providing the underlying infrastructure to control component 610 software processes, the OS kernel 620 also provides a link between the control component 610 and the packet forwarding component 690.

Referring to the routing protocol process(es) 630 of FIG. 6, this process(es) 630 provides routing and routing control functions within the platform. In this example, the RIP 631, ISIS 632, OSPF 633 and EIGRP 634 (and BGP 635) protocols are provided. Naturally, other routing protocols may be provided in addition, or alternatively. Similarly, the label-based forwarding protocol process(es) 640 provides label forwarding and label control functions. In this example, the LDP 636, RSVP 637, EVPN 638 and L2VPN 639 (and BGP 635) protocols are provided. Naturally, other label-based forwarding protocols (e.g., MPLS, SR, etc.) may be provided in addition, or alternatively. In the example router 600, the routing table(s) 639 is produced by the routing protocol process(es) 630, while the label forwarding information 645 is produced by the label-based forwarding protocol process(es) 640.

Still referring to FIG. 6, the interface process(es) 650 performs configuration of the physical interfaces and encapsulation.

The example control component 610 may provide several ways to manage the router. For example, it 610 may provide a user interface process(es) 660 which allows a system operator 665 to interact with the system through configuration, modifications, and monitoring. The SNMP 685 allows SNMP-capable systems to communicate with the router platform. This also allows the platform to provide necessary SNMP information to external agents. For example, the SNMP 685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 610, thereby avoiding slowing traffic forwarding by the packet forwarding component 690.

Although not shown, the example router 600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 660 via a console port, an auxiliary port, and/or a management Ethernet port.

The packet forwarding component 690 is responsible for properly outputting received packets as quickly as possible. If there is no entry in the forwarding table for a given destination or a given label and the packet forwarding component 690 cannot perform forwarding by itself, it 690 may send the packets bound for that unknown destination off to the control component 610 for processing. The example packet forwarding component 690 is designed to perform Layer 2 and Layer 3 switching, route lookups, and rapid packet forwarding.

As shown in FIG. 6, the example packet forwarding component 690 has an embedded microkernel 692 over hardware components 691, interface process(es) 693, ASIC drivers 694, and chassis process(es) 695, and stores a forwarding (e.g., route-based and/or label-based) table(s) 696. The microkernel 692 interacts with the interface process(es) 693 and the chassis process(es) 695 to monitor and control these functions. The interface process(es) 692 has direct communication with the OS kernel 620 of the control component 610. This communication includes forwarding exception packets and control packets to the control component 610, receiving packets to be forwarded, receiving forwarding table updates, providing information about the health of the packet forwarding component 690 to the control component 610, and permitting configuration of the interfaces from the user interface (e.g., CLI) process(es) 660 of the control component 610. The stored forwarding table (s) 696 is static until a new one is received from the control component 610. The interface process(es) 693 uses the forwarding table(s) 696 to look up next-hop information. The interface process(es) 693 also has direct communication with the distributed ASICs. Finally, the chassis process(es) 695 may communicate directly with the microkernel 692 and with the ASIC drivers 694.

Figure 7:
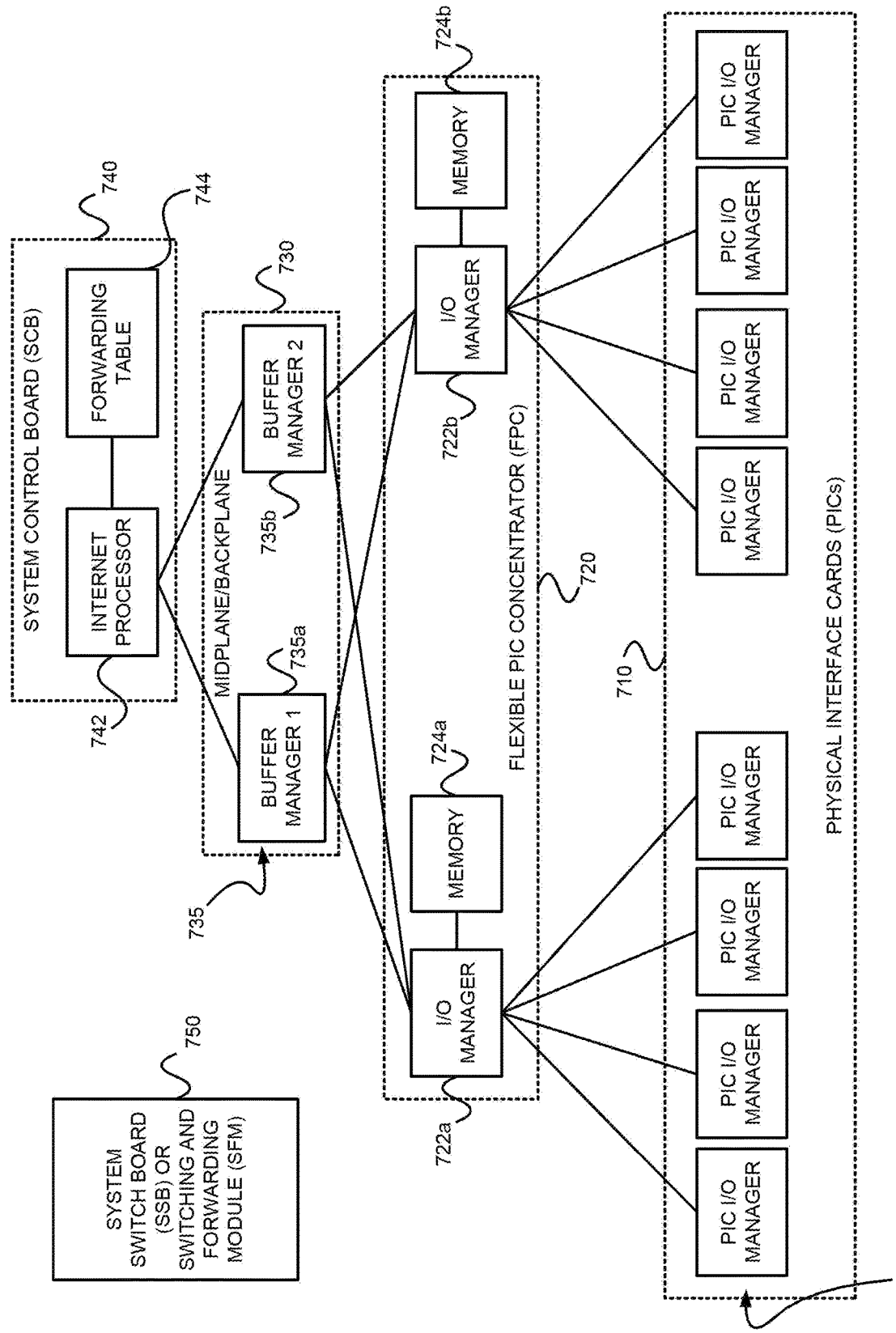
FIG. 7 is an example architecture in which ASICS may be distributed in a packet forwarding component to divide the responsibility of packet forwarding.

FIG. 7 is an example of how the ASICS may be distributed in the packet forwarding component 690 to divide the responsibility of packet forwarding. As shown in FIG. 7, the ASICs of the packet forwarding component 690 may be distributed on physical interface cards ("PICs") 710, flexible PIC concentrators ("FPCs") 720, a midplane or backplane 730, and a system control board(s) 740 (for switching and/or forwarding). Switching fabric is also shown as a system switch board ("SSB"), or a switching and forwarding module ("SFM") 750 (which may be a switch fabric 750' as shown in FIGS. 8A and 8B). Each of the PICs 710 includes one or more PIC I/O managers 715. Each of the FPCs 720 includes one or more I/O managers 722, each with an associated memory 724 (which may be a RDRAM 724' as shown in FIGS. 8A and 8B). The midplane/backplane 730 includes buffer managers 735a, 735b. Finally, the system control board 740 includes an internet processor 742 and an instance of the forwarding table 744 (Recall, e.g., 696 of FIG. 6).

Still referring to FIG. 7, the PICs 710 contain the interface ports. Each PIC 710 may be plugged into an FPC 720. Each individual PIC 710 may contain an ASIC that handles media-specific functions, such as framing or encapsulation. Some example PICs 710 provide SDH/SONET, ATM, Gigabit Ethernet, Fast Ethernet, and/or DS3/E3 interface ports.

An FPC 720 can contain one or more PICs 710, and may carry the signals from the PICs 710 to the midplane/backplane 730 as shown in FIG. 7.

The midplane/backplane 730 holds the line cards. The line cards may connect into the midplane/backplane 730 when inserted into the example router's chassis from the front. The control component (e.g., routing engine) 610 may plug into the rear of the midplane/backplane 730 from the rear of the chassis. The midplane/backplane 730 may carry electrical (or optical) signals and power to each line card and to the control component 610.

The system control board 740 may perform forwarding lookup. It 740 may also communicate errors to the routing engine. Further, it 740 may also monitor the condition of the router based on information it receives from sensors. If an abnormal condition is detected, the system control board 740 may immediately notify the control component 610.

Referring to FIGS. 7, 8A and 8B, in some exemplary routers, each of the PICs 710,710' contains at least one I/O manager ASIC 715 responsible for media-specific tasks, such as encapsulation. The packets pass through these I/O ASICs on their way into and out of the router. The I/O manager ASIC 715 on the PIC 710,710' is responsible for managing the connection to the I/O manager ASIC 722 on the FPC 720,720', managing link-layer framing and creating the bit stream, performing cyclical redundancy checks (CRCs), and detecting link-layer errors and generating alarms, when appropriate. The FPC 720 includes another I/O manager ASIC 722. This ASIC 722 (shown as a layer 2/layer 3 packet processing component 710'/720') takes the packets from the PICs 710 and breaks them into (e.g., 74-byte) memory blocks. This FPC I/O manager ASIC 722 (shown as a layer 2/layer 3 packet processing component 710'/720') sends the blocks to a first distributed buffer manager (DBM) 735a (shown as switch interface component 735a'), decoding encapsulation and protocol-specific information, counting packets and bytes for each logical circuit, verifying packet integrity, and applying class of service (CoS) rules to packets. At this point, the packet is first written to memory. More specifically, the example DBM ASIC 735/735a' manages and writes packets to the shared memory 724 across all FPCs 720. In parallel, the first DBM ASIC 735/735a' also extracts information on the destination of the packet and passes this forwarding-related information to the Internet processor 742/742'. The Internet processor 742/742' performs the route lookup using the forwarding table 744 and sends the information over to a second DBM ASIC 735b'. The Internet processor ASIC 742/742' also collects exception packets (i.e., those without a forwarding table entry) and sends them to the control component 610. The second DBM ASIC 725 (shown as a queuing and memory interface component 735b') then takes this information and the 74-byte blocks and forwards them to the I/O manager ASIC 722 of the egress FPC 720/720' (or multiple egress FPCs, in the case of multicast) for reassembly. (Thus, the DBM ASICs 735a/735a' and 735b/735b' are responsible for managing the packet memory 724/724' distributed across all FPCs 720/720', extracting forwarding-related information from packets, and instructing the FPC where to forward packets.)

The I/O manager ASIC 722 on the egress FPC 720/720' may perform some value-added services. In addition to incrementing time to live ("TTL") values and re-encapsulating the packet for handling by the PIC 710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 722 on the egress FPC 720/720' may be responsible for receiving the blocks from the second DBM ASIC 735/735', incrementing TTL values, queuing a pointer to the packet, if necessary, before applying CoS rules, re-encapsulating the blocks, and sending the encapsulated packets to the PIC I/O manager ASIC 715.

Figure 9:
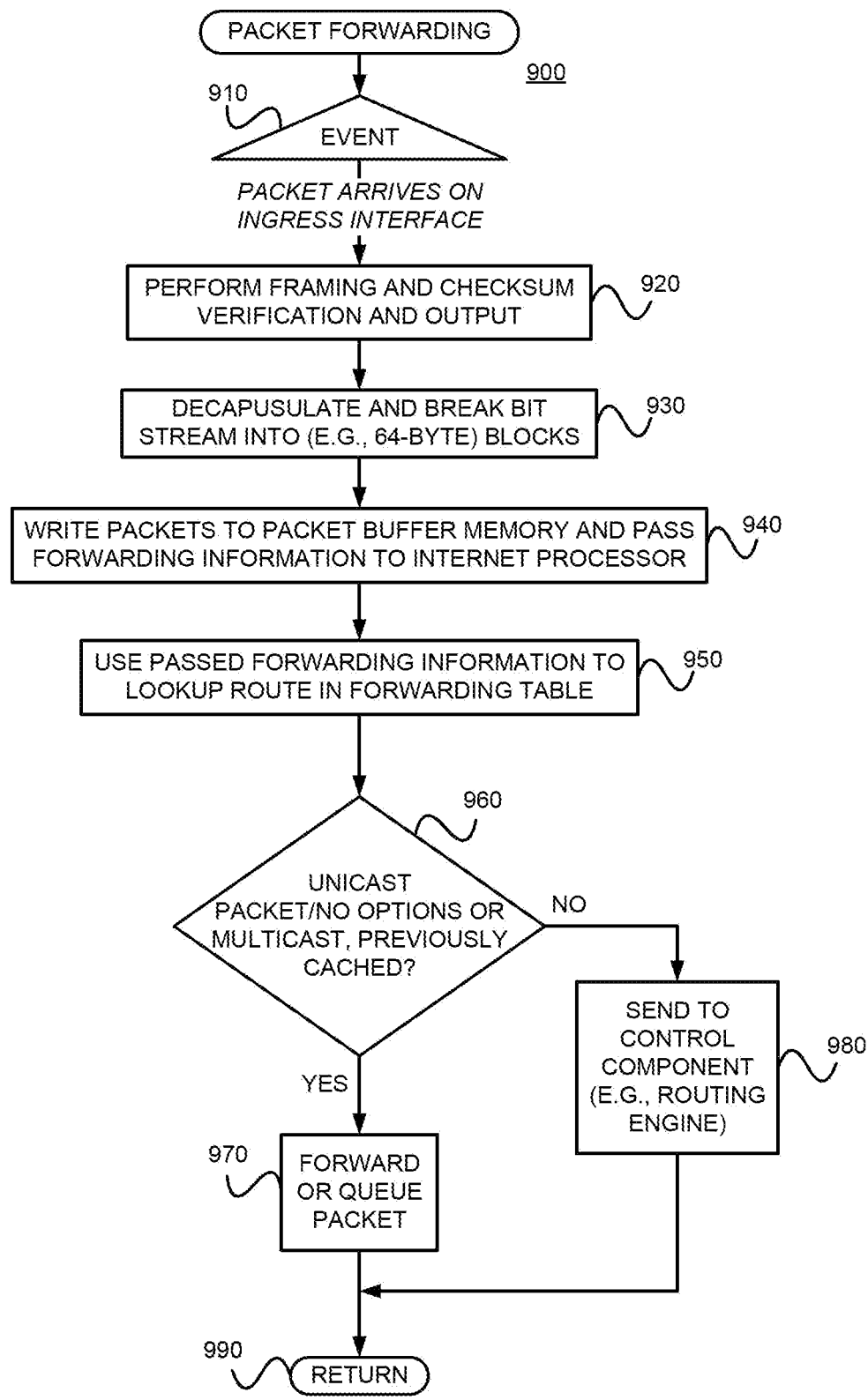
FIG. 9 is a flow diagram of an example method for providing packet forwarding in an example router.

FIG. 9 is a flow diagram of an example method 900 for providing packet forwarding in the example router. The main acts of the method 900 are triggered when a packet is received on an ingress (incoming) port or interface. (Event 910) The types of checksum and frame checks that are required by the type of medium it serves are performed and the packet is output, as a serial bit stream. (Block 920) The packet is then decapsulated and parsed into (e.g., 64-byte) blocks. (Block 930) The packets are written to buffer memory and the forwarding information is passed on the Internet processor. (Block 940) The passed forwarding information is then used to lookup a route in the forwarding table. (Block 950) Note that the forwarding table can typically handle unicast packets that do not have options (e.g., accounting) set, and multicast packets for which it already has a cached entry. Thus, if it is determined that these conditions are met (YES branch of Decision 960), the packet forwarding component finds the next hop and egress interface, and the packet is forwarded (or queued for forwarding) to the next hop via the egress interface (Block 970) before the method 900 is left (Node 990) Otherwise, if these conditions are not met (NO branch of Decision 960), the forwarding information is sent to the control component 610 for advanced forwarding resolution (Block 980) before the method 900 is left (Node 990).

Referring back to block 970, the packet may be queued. Actually, as stated earlier with reference to FIG. 7, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 722 may send a request for the packet to the second DBM ASIC 735b. The DBM ASIC 735 reads the blocks from shared memory and sends them to the I/O manager ASIC 722 on the FPC 720, which then serializes the bits and sends them to the media-specific ASIC of the egress interface. The I/O manager ASIC 715 on the egress PIC 710 may apply the physical-layer framing, perform the CRC, and send the bit stream out over the link.

Referring back to block 980 of FIG. 9, as well as FIG. 7, regarding the transfer of control and exception packets, the system control board 740 handles nearly all exception packets. For example, the system control board 740 may pass exception packets to the control component 610.

Although example embodiments consistent with the present description may be implemented on the example routers of FIG. 5 or 6, embodiments consistent with the present description may be implemented on communications network nodes (e.g., routers, switches, etc.) having different architectures. More generally, embodiments consistent with the present description may be implemented on an example system 900 as illustrated on FIG. 10.

Figure 10:
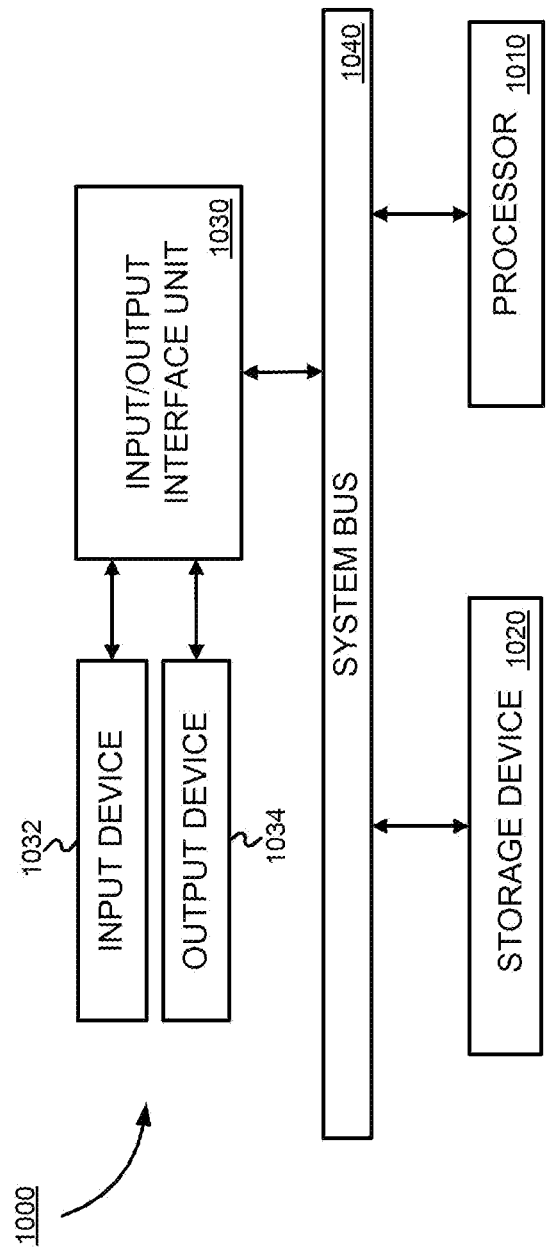
FIG. 10 is a block diagram of an exemplary machine that may perform one or more of the processes described, and/or store information used and/or generated by such processes.

FIG. 10 is a block diagram of an exemplary machine 1000 that may perform one or more of the processes described, and/or store information used and/or generated by such processes. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components of the present description.

In some embodiments consistent with the present description, the processors 1010 may be one or more microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

What is claimed is:

1. A computer-implemented method, for use in a communications network including
    a plurality of IS-IS flood reflection (FR) clusters each including (1) at least one FR server, (2) at least two FR clients, (3) at least two IS-IS level 1 (L1) nodes, (4) L1 links between at least some of the at least two L1 nodes and the at least two FR clients within the FR cluster and between at least some of the at least two L1 nodes and at least one FR server within the FR cluster, and (5) IS-IS level 2 (L2) FR links between the each of the at least two FR clients and the at least one FR server within the FR cluster,
    a backbone including at least two L2 nodes, and
    L2 links between at least some of the at least two L2 nodes and the at least two FR clients in each of the plurality of IS-IS FR clusters,
in which traffic engineered (TE) paths across the plurality of FR clusters are computed using abstract traffic engineering (TE) visibility, the computer-implemented method being performed by a node serving as an endpoint terminating one of the L2 FR links and comprising:
    a) receiving, for every local one of the L2 FR links terminated by the node, either (A) a max flow bandwidth to a remote end of the local one of the L2 FR links, or (B) information derived from a max flow bandwidth to a remote end of the local one of the L2 FR links; and
    b) advertising, by an IS-IS protocol process, for receipt by any IS-IS L2 device, the (A) an available max flow bandwidth to a remote end of the local one of the L2 FR links terminated by the node, or (B) information derived from an available max flow bandwidth to a remote end of the local one of the L2 FR links terminated by the node, received, in association with the local one of the L2 FR links, instead of advertising an unlimited bandwidth in association with the local one of the L2 FR links.

2. The computer-implemented method of claim 1, wherein either (A) the max flow bandwidth to a remote end of the local one of the L2 FR links terminated by the node, or (B) the information derived from a max flow bandwidth to a remote end of the local one of the L2 FR links terminated by the node, is received from a path computation engine (PCE).

3. The computer-implemented method of claim 2, wherein the node is one of the FR clients,
    wherein the act of receiving, for every local one of the L2 FR links terminated by the node, either (A) a max flow bandwidth to a remote end of the local one of the L2 FR links, or (B) information derived from a max flow bandwidth to a remote end of the local one of the L2 FR links, is performed by a L2 FR link bandwidth management process,
    wherein the L2 FR link bandwidth management process and the IS-IS protocol process reside on the node, and wherein the PCE resides off of the node.

4. The computer-implemented method of claim 3, wherein a control message of a PCE protocol process includes a type-length-value (TLV) indicating (1) that there is no path being setup and (2) that the message is a request for a max-flow bandwidth computation.

5. The computer-implemented method of claim 2, wherein the node is one of the FR clients, and
    wherein the act of receiving, for every local one of the L2 FR links terminated by the node, either (A) a max flow bandwidth to a remote end of the local one of the L2 FR links, or (B) information derived from a max flow bandwidth to a remote end of the local one of the L2 FR links, by a L2 FR link bandwidth management process,
    wherein the L2 FR link bandwidth management process, the path computation process (PCE), and the IS-IS protocol process reside on the node.

6. The computer-implemented method of claim 2, wherein the node is one of the FR servers,
    wherein the act of receiving, for every local one of the L2 FR links terminated by the node, either (A) a max flow bandwidth to a remote end of the local one of the L2 FR links, or (B) information derived from a max flow bandwidth to a remote end of the local one of the L2 FR links, by a L2 FR link bandwidth management process, and
    wherein the L2 FR bandwidth management process, the path computation process (PCE), and the IS-IS protocol process reside on the node.

7. The computer-implemented method of claim 1, wherein the act of receiving, for every local one of the L2 FR links terminated by the node, either (A) a max flow bandwidth to a remote end of the local one of the L2 FR links, or (B) information derived from a max flow bandwidth to a remote end of the local one of the L2 FR links, by a L2 FR link bandwidth management process, and
    wherein either (A) the max flow bandwidth to a remote end of the local one of the L2 FR links terminated by the node, or (B) the information derived from a max flow bandwidth to a remote end of the local one of the L2 FR links terminated by the node, received by the L2 FR link bandwidth management process is received from a path computation engine (PCE) in response to a request from the L2 FR link bandwidth management process to the PCE.

8. The computer-implemented method of claim 1, wherein the act of advertising, by an IS-IS protocol process, either (A) the available max flow bandwidth to a remote end of the local one of the L2 FR links terminated by the node, or (B) the information derived from the available max flow bandwidth to a remote end of the local one of the L2 FR links terminated by the node, received, in association with the local one of the L2 FR links terminated by the node, instead of advertising an unlimited bandwidth in association with the local one of the L2 FR links terminated by the node, is performed periodically.

9. The computer-implemented method of claim 1, wherein the act of advertising, by an IS-IS protocol process, either (A) the available max flow bandwidth to a remote end of the local one of the L2 FR links terminated by the node, or (B) the information derived from the available max flow bandwidth to a remote end of the local one of the L2 FR links terminated by the node, received, in association with the local one of the L2 FR links terminated by the node, instead of advertising an unlimited bandwidth in association with the local one of the L2 FR links terminated by the node, is performed responsive to a condition selected from a group of conditions consisting of: (A) an absolute bandwidth increase meeting an absolute increase threshold; (B) an absolute bandwidth decrease meeting an absolute decrease threshold; (C) a bandwidth increase percentage meeting a percentage increase threshold; and (D) a bandwidth decrease percentage meeting a percentage decrease threshold.

10. The computer-implemented method of claim 1, wherein the node is one of the FR clients,
wherein the act of receiving, for every local one of the L2 FR links terminated by the node, either (A) a max flow bandwidth to a remote end of the local one of the L2 FR links, or (B) information derived from a max flow bandwidth to a remote end of the local one of the L2 FR links, by a L2 FR link bandwidth management process, and
wherein the L2 FR link bandwidth management process, and the IS-IS protocol process reside on the node.

11. The computer-implemented method of claim 1, wherein the node is one of the FR servers,
wherein the act of receiving, for every local one of the L2 FR links terminated by the node, either (A) a max flow bandwidth to a remote end of the local one of the L2 FR links, or (B) information derived from a max flow bandwidth to a remote end of the local one of the L2 FR links, by a L2 FR link bandwidth management process, and
wherein the L2 FR bandwidth management process, and the IS-IS protocol process reside on the node.

12. A device configured for use in a communications network including
a plurality of IS-IS flood reflection (FR) clusters each including (1) at least one FR server, (2) at least two FR clients, (3) at least two IS-IS level 1 (L1) node, (4) L1 links between at least some of the at least two L1 nodes and the at least two FR clients within the FR cluster and between at least some of the at least two L1 nodes and at least one FR server within the FR cluster, and (5) IS-IS level 2 (L2) FR links between the each of the at least two FR clients and the at least one FR server within the FR cluster,
a backbone including at least two L2 nodes, and
L2 links between at least some of the at least two L2 nodes and the at least two FR clients in each of the plurality of IS-IS FR clusters,
in which traffic engineered (TE) paths across the plurality of FR clusters are computed using abstract traffic engineering (TE) visibility, the device serving as an endpoint terminating one of the L2 FR links and comprising:
a) at least one processor; and
b) a non-transitory storage system storing processor-executable instructions which, when executed by the at least one processor, cause the at least one processor to perform a method including
1) receiving, for every local one of the L2 FR links terminated by the device, either (A) a max flow bandwidth to a remote end of the local one of the L2 FR links terminated by the device, or (B) information derived from a max flow bandwidth to a remote end of the local one of the L2 FR links terminated by the device, and
2) advertising, for receipt by any IS-IS L2 device, the (A) an available max flow bandwidth to a remote end of the local one of the L2 FR links terminated by the device, or (B) information derived from an available max flow bandwidth to a remote end of the local one of the L2 FR links terminated by the device, received, in association with the local one of the L2 FR links, instead of advertising an unlimited bandwidth in association with the local one of the L2 FR links terminated by the device.

13. The device claim 12, wherein either (A) the max flow bandwidth to a remote end of the local one of the L2 FR links terminated by the device, or (B) the information derived from a max flow bandwidth to a remote end of the local one of the L2 FR links terminated by the device, received by the L2 FR link bandwidth management process is received from a path computation engine (PCE).

14. The device of claim 13, wherein the device is one of the FR clients, and
wherein the PCE resides off of the device.

15. The device of claim 13, wherein the device is one of the FR clients.

16. The device of claim 13, wherein the device is one of the FR servers.

17. The device of claim 12, wherein either (A) the max flow bandwidth to a remote end of the local one of the L2 FR links terminated by the device, or (B) the information derived from a max flow bandwidth to a remote end of the local one of the L2 FR links terminated by the device, is received from a path computation engine (PCE) in response to a request to the PCE.

18. The device of claim 12, wherein the act of advertising either (A) the available max flow bandwidth to a remote end of the local one of the L2 FR links terminated by the device, or (B) the information derived from the available max flow bandwidth to a remote end of the local one of the L2 FR links terminated by the device, received, in association with the local one of the L2 FR links terminated by the device, instead of advertising an unlimited bandwidth in association with the local one of the L2 FR links terminated by the device, is performed periodically.

19. The device of claim 12, wherein the act of advertising either (A) the available max flow bandwidth to a remote end of the local one of the L2 FR links terminated by the device, or (B) the information derived from the available max flow bandwidth to a remote end of the local one of the L2 FR links terminated by the device, received, in association with the local one of the L2 FR links, instead of advertising an unlimited bandwidth in association with the local one of the L2 FR links terminated by the device, is performed responsive to a condition selected from a group of conditions consisting of: (A) an absolute bandwidth increase meeting an absolute increase threshold: (B) an absolute bandwidth decrease meeting an absolute decrease threshold; (C) a bandwidth increase percentage meeting a percentage increase threshold; and (D) a bandwidth decrease percentage meeting a percentage decrease threshold.

20. A non-transitory computer-readable medium storing processor-executable instructions which, when executed by at least one processor, cause the at least one processor to perform a method for use in a communications network including
a plurality of IS-IS flood reflection (FR) clusters each including (1) at least one FR server, (2) at least two FR clients, (3) at least two IS-IS level 1 (L1) nodes, (4) L1 links between at least some of the at least two L1 nodes and the at least two FR clients within the FR cluster and between at least some of the at least two L1 nodes and at least one FR server within the FR cluster, and (5) IS-IS level 2 (L2) FR links between the each of the at least two FR clients and the at least one FR server within the FR cluster, a backbone including at least two L2 nodes, and L2 links between at least some of the at least two L2 nodes and the at least two FR clients in each of the plurality of IS-IS FR clusters, in which traffic engineered (TE) paths across the plurality of FR clusters are computed using abstract traffic engineering (TE) visibility, the computer-implemented method being performed by a node serving as an endpoint terminating one of the L2 FR links and comprising:

a) receiving, for every local one of the L2 FR links terminated by the node, either (A) a max flow bandwidth to a remote end of the local one of the L2 FR links, or (B) information derived from a max flow bandwidth to a remote end of the local one of the L2 FR links; and b) advertising, by an IS-IS protocol process, for receipt by any IS-IS L2 device, the (A) an available max flow bandwidth to a remote end of the local one of the L2 FR links terminated by the node, or (B) information derived from an available max flow bandwidth to a remote end of the local one of the L2 FR links terminated by the node, received, in association with the local one of the L2 FR links, instead of advertising an unlimited bandwidth in association with the local one of the L2 FR links.

* * * * *